(12) United States Patent
Kaczyński et al.

(10) Patent No.: US 11,210,407 B2
(45) Date of Patent: Dec. 28, 2021

(54) ELECTRONIC COMMUNICATIONS DEVICE AND MESSAGING APPLICATION THEREFOR

(71) Applicant: V440 SPÓŁKA AKCYJNA, Warsaw (PL)

(72) Inventors: Kamil Kaczyński, Warsaw (PL); Michal Glet, Warsaw (PL)

(73) Assignee: V440 SPÓŁKA AKCYJNA, Warsaw (PL)

( * ) Notice: Subject to any disclaimer, the term of this patent is extended or adjusted under 35 U.S.C. 154(b) by 351 days.

(21) Appl. No.: 16/257,301

(22) Filed: Jan. 25, 2019

(65) Prior Publication Data

US 2020/0242256 A1    Jul. 30, 2020

(51) Int. Cl.
| | |
|---|---|
| *G06F 21/60* | (2013.01) |
| *G06F 21/31* | (2013.01) |
| *H04L 9/32* | (2006.01) |
| *H04L 12/58* | (2006.01) |
| *G06F 21/62* | (2013.01) |

(52) U.S. Cl.
CPC ............ *G06F 21/602* (2013.01); *G06F 21/31* (2013.01); *G06F 21/6227* (2013.01); *H04L 9/3236* (2013.01); *H04L 51/046* (2013.01); *H04L 51/22* (2013.01)

(58) Field of Classification Search
CPC .... G06F 21/31; G06F 21/602; G06F 21/6227; H04L 51/22; H04L 51/046; H04L 9/3236
USPC ........................................................ 713/165
See application file for complete search history.

(56) References Cited

U.S. PATENT DOCUMENTS

| | | | | |
|---|---|---|---|---|
| 9,344,413 | B2* | 5/2016 | Kirsch | ........................ H04L 9/14 |
| 2002/0053035 | A1* | 5/2002 | Schutzer | ................. G06F 21/32 |
| | | | | 726/5 |
| 2004/0153675 | A1* | 8/2004 | Dorn | .................... G06F 21/6218 |
| | | | | 726/5 |
| 2005/0191988 | A1 | 9/2005 | Thornton et al. | |
| 2009/0249443 | A1 | 10/2009 | Fitzgerald et al. | |
| 2012/0131685 | A1 | 5/2012 | Broch et al. | |
| 2014/0204935 | A1* | 7/2014 | Rojas | ...................... H04L 51/04 |
| | | | | 370/352 |

(Continued)

FOREIGN PATENT DOCUMENTS

| | | |
|---|---|---|
| WO | 2015196447 A1 | 12/2015 |
| WO | 2015198336 A1 | 12/2015 |

OTHER PUBLICATIONS

NPL Search Terms (Year: 2021).*
European Patent Office, Extended European Search Report, Application No. 19020044.4, dated Jul. 9, 2019, 9 pages.

*Primary Examiner* — Syed A Zaidi
(74) *Attorney, Agent, or Firm* — Ziegler IP Law Group, LLC

(57) ABSTRACT

A messaging application for a messaging service for an electronic communications device including a data store, the application being configured to: store, in encrypted form, message data for an identity registered on the messaging service as a database file on the electronic communications device; require a user to input a predetermined access code for the registered identity before giving the user access to the stored message data; and delete from the device the database file containing the encrypted message data in the event that a particular different predetermined code other than the predetermined access code is provided in place of the predetermined access code.

11 Claims, 3 Drawing Sheets

(56) References Cited

U.S. PATENT DOCUMENTS

2015/0074765 A1* 3/2015 Haight .................. H04L 63/083
    726/4
2015/0180894 A1* 6/2015 Sadovsky ............... H04L 67/22
    726/22
2016/0300074 A1* 10/2016 Huang ................ G06F 21/6245

* cited by examiner

Enter password

\*\*\*\*\*\*\*\*

☐ Show password

FIG. 2

ELECTRONIC COMMUNICATIONS DEVICE AND MESSAGING APPLICATION THEREFOR

TECHNICAL FIELD

The aspects of the disclosed embodiments relate generally to communication technology and data security therefor; and more specifically, a to messaging application and an electronic communications device implementing the messaging application.

BACKGROUND

In the present era of globalization and technological advancement, lives of people have become dependent on electronic communication devices such as smart phones more than ever. A person tends to use his/her phone to perform daily chores such as travelling, cooking, communicating and so forth. A person (namely, an owner) uses his/her personal electronic device for various purposes like placing a call, clicking pictures, staying connected with their contacts via various smartphone-based messaging applications and so forth. Notably, a user's personal electronic device is a personal gadget (namely, utility) and contains personal and confidential information related to the owner. The owner may use his/her smartphone for communicating sensitive information such as business details, security details, travel details and other confidential information. Generally, the owner tends to protect against unauthorized access to his/her smartphone by securing it with a lock code, password or the like.

Journalists, investigators and others who use a messaging application on their personal electronic device, and their contacts, may be at risk of imprisonment, death, or other punishments in the event that message data is exposed to scrutiny. There is a risk that such a user may be seized while they are using a messaging application on their device or that they may be forced to disclose an access code for the messaging application. Because of this, it may be dangerous for such at risk users to make use of messaging applications.

Therefore, in light of the foregoing discussion, there exists a need to overcome the aforementioned drawbacks associated with the existing security measures for messaging applications.

SUMMARY

The aspects of the disclosed embodiments seek to provide a messaging application for a messaging service for an electronic communications device. The present invention also seeks to provide an electronic communications device having a messaging application. The present invention seeks to provide a solution to the existing problem of inefficient data security in messaging applications and electronic communications devices. An aim of the present invention is to, provide a solution that overcomes at least partially, the problems encountered in prior art.

In one aspect, an embodiment of the present disclosure provides a messaging application for a messaging service for an electronic communications device including a data store, the messaging application being configured to:

store, in encrypted form, message data for an identity registered on the messaging service as a database file on the electronic communications device;

require a user to input a predetermined access code for the registered identity before giving the user access to the stored message data; and delete from the device the database file containing the encrypted message data in the event that a particular different predetermined code other than the predetermined access code is provided in place of the predetermined access code.

In another aspect, an embodiment of the present disclosure provides an electronic communications device including a data store and a processor, the electronic communications device having a messaging application for a messaging service, the processor being configured to execute the messaging application to:

store, in encrypted form, message data for an identity registered on the messaging service, as a database file in the data store of the device;

require a user to input a predetermined access code for the registered identity before giving the user access to the stored message data; and delete from the device the database file containing the encrypted message data in the event that a particular different predetermined code other than the predetermined access code is provided in place of the predetermined access code.

Embodiments of the present disclosure, provide a means for a user to safeguard their message data in the event that the user is compromised.

Additional aspects, advantages, features and objects of the present invention will be made apparent from the drawings and the detailed description of the illustrative embodiments construed in conjunction with the appended claims that follow.

It will be appreciated that features of the present disclosure are susceptible to being combined in various combinations without departing from the scope of the present invention as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present invention, exemplary constructions of the embodiments of the invention are shown in the drawings. However, the present invention is not limited to the specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 2 is an exemplary schematic diagram of a user interface for the electronic communications device of FIG. 1, in accordance with an embodiment of the present disclosure.

Figure 1:
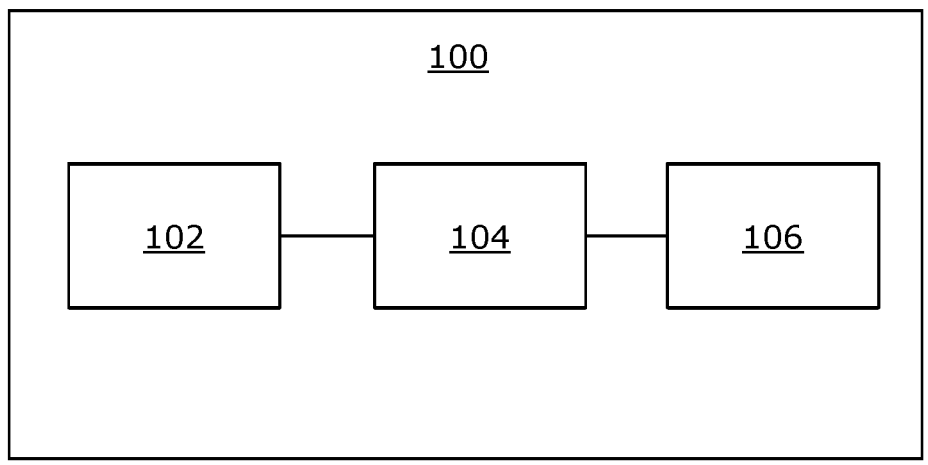
FIG. 1 is a block diagram of an electronic communications device, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description, illustrates embodiments of the present disclosure and ways in which they can be implemented. Although some modes of carrying out the present invention have been disclosed, those skilled in the art will recognize that other embodiments for carrying out or practicing the present invention are also possible.

In one aspect, an embodiment of the present disclosure provides a messaging application for a messaging service for an electronic communications device including a data store, the messaging application being configured to:

store, in encrypted form, message data for an identity registered on the messaging service as a database file on the electronic communications device;

require a user to input a predetermined access code for the registered identity before giving the user access to the stored message data; and delete from the device the database file containing the encrypted message data in the event that a particular different predetermined code other than the predetermined access code is provided in place of the predetermined access code.

In another aspect, an embodiment of the present disclosure provides an electronic communications device including a data store and a processor, the electronic communications device having a messaging application for a messaging service, the processor being configured to execute the messaging application to:

store, in encrypted form, message data for an identity registered on the messaging service, as a database file in the data store of the device;

require a user to input a predetermined access code for the registered identity before giving the user access to the stored message data; and delete from the device the database file containing the encrypted message data in the event that a particular different predetermined code other than the predetermined access code is provided in place of the predetermined access code.

The present i provides a messaging application for a messaging service for an electronic communications device and an electronic communications device having a messaging application. The messaging application and the electronic communications device disclosed herein help to improve the privacy of a user of the messaging application. Furthermore, the messaging application and the electronic communications device disclosed herein reduces the threat of message data of a messaging application becoming compromised. Beneficially, the messaging application and the electronic communications device provides a secured approach for communicating private, sensitive and confidential information. Moreover, the invention disclosed herein is compatible with existing hardware and software infrastructure.

Disclosed herein is the messaging application for the messaging service for the electronic communications device including the data store. The messaging application is a software program or a software application that runs on the electronic communications device such as a smartphone, tablet, laptop and the like. The messaging application running on the electronic communications device allows the user to communicate with other communication devices or a person associated therewith. Specifically, the messaging application enables the user to exchange text messages, images, documents, audio, text or video files and the like. Furthermore, the electronic communications device has one or more processors for executing the messaging application thereon. In addition, the electronic communications device comprises electronic circuitry enabling access to mobile and/or internet networks. Furthermore, the electronic communications device has a user-interface for enabling interaction with the user. Moreover, the electronic communications device is enabled to associate with the messaging service, wherein the messaging service is a software and/or hardware-based platform (namely, utility) that provides channel for exchange of messages (namely, communication) between two or more electronic communications devices. The messaging service establishes communication between two or more electronic communications devices using mobile and/or internet networks. Furthermore, the electronic communications device includes the data store that acts as a repository of data associated with the messaging application. The data store is a database that is local to the electronic communications device. The data store is a set of contiguous or non-contiguous memory locations that stores data associated with the messaging application.

As mentioned previously, the messaging application is configured to store, in encrypted form, message data for the identity registered on the messaging service as a database file on the electronic communications device. The identity is registered on the messaging service for using a service provided by the messaging application. In other words, the identity registered on the messaging service is a user identifier such as a numerical, alphabetical or alphanumerical string that is stored in a database of authentic users of the messaging service. The database of authentic users contains detail of one or more identities registered with the messaging service. A messaging application identity is registered with the messaging service using the electronic communications device. In other words, the user associated with the identity registered on the messaging service uses the messaging application by way of the electronic communications device. The user associated with the identity registered on the messaging service uses the messaging application for communication tasks including: sharing and receiving texts, documents, images, audio/video/text files and data in different formats, with one or more contacts whose identities may be stored in the electronic communications device. It is to be understood that the terms "identity registered on the messaging service" and "registered identity" are used interchangeably herein.

In addition, the communication tasks have messaging data associated therewith, wherein the messaging data includes information such as a sender, a recipient, a time, a date, a location and so forth. In other words, the messaging data includes information regarding communication tasks carried out by the identity registered on the messaging service, using the messaging application. Furthermore, the messaging data are stored locally on the electronic communications device in form of the database file. The database file stores the message data in encrypted form. The message data are encrypted by the processor of the electronic communications device. The processor within the electronic communication device executes one or more encryption techniques for encrypting the message data, wherein such encryption techniques include Advanced Encryption Standard (AES), Triple Data Encryption Standard (3DES), Twofish, RSA and the like. In addition, the processor encrypts the message data by way of storing them optionally in form of a ciphertext using cipher techniques such as substitution cipher, transposition cipher and the like.

Furthermore, the processor in the electronic communications device is a computational element that is operable to respond to and processes instructions that execute the messaging application on the electronic communications device. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated with a processing device that may be shared by other processing devices. Additionally, the one or more individual processors, processing devices and elements are arranged in various architectures for responding to and processing various operations and instructions on the electronic communications device.

Optionally, the user may use the messaging application for receiving incoming calls and placing outgoing calls to one or more contacts in the electronic communications device.

Furthermore, the messaging application is configured to require the user to input the predetermined access code for the registered identity before giving the user access to stored message data. The messaging application performs user authentication using the predetermined access code for the registered identity. The messaging application prevents access to unauthorized users by locking the messaging application with the predetermined access code. A given user gets access to the messaging application and message data by providing the predetermined access code to the messaging application. Beneficially, the predetermined access code is a security code (namely, a password) that restricts access to the messaging application and message data and increases security and ensures privacy of the user. The predetermined access code is stored locally in the electronic communications device. The user provides the predetermined access code to the messaging application using some input means, like keypad, voice command, biometric signature, etc. in the electronic communications device. Herein, the user may be an individual, organisation, and the like using the messaging application on the electronic communications device. The predetermined access code provided by the user is matched with the predetermined access code stored locally in the electronic communications device. The user is granted access to the message data, in case the predetermined access code provided thereby matches the predetermined access code stored locally in the electronic communications device.

Preferably, the predetermined access code may be user defined. In addition, the predetermined access code may have constraints, such as minimum length should be 8 digits, must include at least one capital character, must include at least one numerical digit, must include at least one special character, password should not include first name or last name of the user and the like. Generally, the predetermined access code is stored in the electronic communications device in a form that is not traceable. Consequently, the predetermined access code remains undetected in an instance when an unauthorized user gets access to the electronic communications device.

Optionally, the messaging application may obtain the predetermined code by way of voice command, wherein the messaging application recognizes voice of an authorized user by implementing voice (namely, speech) recognition techniques such as Dynamic time warping (DTW)-based speech recognition, End-to-end automatic speech recognition and the like.

As mentioned previously, the messaging application is configured to delete from the device the database file containing the encrypted message data in the event that the particular different predetermined code is provided in place of the predetermined access code. The messaging application matches the access code provided by the user with the particular different predetermined code stored locally in the electronic communications device. The particular different predetermined code is an emergency code that is provided by the user to the messaging application using the electronic communications device in a situation when the user does not want unauthorized access to the message data. The messaging application matches the emergency code with the particular different predetermined code stored in the electronic communications device locally. In an instance, when the emergency code provided by a user matches the particular different predetermined code stored locally in the electronic communications device, the messaging application deletes the database file that contains message data in encrypted form. Notably, the database file contains the message data in encrypted form, consequently once deleted, the message data cannot be restored in a readable state thereof.

The particular different predetermined code is preferably user-defined. In addition, the user may have to follow certain constraints like use of special characters, minimum characters required and the like in generating the particular different predetermined code. Alternatively, the particular different predetermined code may be machine generated.

Optionally, the messaging application is configured to accept access codes in the form of gestures captured by an image capture module of the device, or patterns of touch captured by a touch-sensitive interface of the device. It is to be understood that access codes include: the predetermined access code and the particular different predetermined code. The user-interface of the electronic communications device may have the image capture module capable of recognizing gestures made by the user. Notably, the image capture module may be capable of recognizing gestures that fall in line of sight of the image capture module. Furthermore, the electronic communications device may have touch-sensitive interface that allows the user to provide the predetermined access code and the particular different predetermined code in form of patterns. Beneficially, ability of the application to accept the access codes in form of gestures or patterns increases user-friendliness of messaging application and the electronic communications device.

Optionally, the image capture module may be configured to accept the predetermined access code and the particular different predetermined code by way of scanning a retina of the user (for example, the predetermined access code might involve a scan of the user's left retina and the particular different predetermined code might involve a scan of the user's right retina). In addition, the electronic communications device may also support setting up of the predetermined access code and the particular different predetermined code by way of face recognition techniques (for example, the predetermined access code might involve the user making a first expression and the particular different predetermined code might involve the user making a second expression).

Optionally, the predetermined access code and the particular different predetermined code may be provided to the electronic communications device in form of text via the electronic communications device. The predetermined access code and the particular different predetermined code provided in text form may not be visible to the user of the electronic communications device. In addition, the user may be able to see the predetermined access code and the particular different predetermined code using a show password option.

Optionally, the messaging application is further configured, in the event that the particular different predetermined code is provided in place of the predetermined access code, to send a communication to a server administering the messaging service to unregister the identity from the service so that the service will subsequently not transmit notifications of incoming calls or messages made to the registered identity. The messaging application, via the electronic communications device, communicates with the server, wherein the server may be an infrastructure based on hardware, software, firmware, or a combination thereof for managing user registration, user removal, and other user activities including incoming and outgoing messages and calls. The server may administrate user activities of the messaging application, wherein the server may have one or more processors and other electronic circuitry for such administration of user activities. The server may keep a log of incoming and outgoing messages and calls of the electronic communications device associated with the registered identity. It is to be understood that the messaging application is enabled to communicate with the server. In addition, the user may also communicate to the server arrangement using the electronic communications device. More optionally, the server may be a third-party platform assigned to manage the messaging service. In an instance, when a user associated with a given registered identity provides the particular different predetermined code, the given registered identity may get unregistered from the database of authentic users of the messaging service. Notably, the messaging application instructs the server to deregister the given registered identity. Consequently, notifications of future texts and calls will not be sent to any electronic communications device associated with the given registered identity.

Optionally, the electronic communications device may have one or more contacts therein. In addition, messages with each of the one or more contacts may be secured with separate cryptographic keys. The cryptographic keys for messages with each of the one or more contacts in the electronic communications device may also get deleted after unregistering the registered identity from the messaging service.

Optionally, the particular different predetermined code is stored in the data store of the device as a cryptographic hash. The cryptographic hash may be a digest or signature for the particular different predetermined code. The cryptographic hash of the particular different predetermined code may be unique. The cryptographic hash of the particular different predetermined code may be generated by applying hashing techniques such as Division-remainder method, Folding method, Radix transformation method, Digit rearrangement method and so forth. The cryptographic hash of the particular different predetermined code is stored at a pre-allocated memory location within the data store of the electronic communications device. In an instance, when the access code provided by the user is different from the predetermined access code, the messaging application may generate a cryptographic hash of the access code provided by the user and match the cryptographic hash of the access code provided by the user with the cryptographic hash of the particular different predetermined code. The encrypted message data in the data store will be deleted and the registered identity will be unregistered from the message service in such an instance when the cryptographic hash of the access code provided by the user matches with the cryptographic hash of the particular different predetermined code.

Optionally, the cryptographic hash is a concatenation of the particular different predetermined code and a unique device identifier. The cryptographic hash may be generated by applying hashing algorithm on the particular different predetermined code concatenated with the unique device identifier. The unique device identifier may be numerical, alphabetical and alphanumerical string that uniquely identifies the electronic communications device. In an example, the unique device identifier may be a phone number of the user. Furthermore, a cryptographic hash function may be used to generate the cryptographic hash. In an example, SHA-256 hashing technique may be applied to generate the cryptographic hash, wherein SHA-256 hashing technique generates a unique 256-bit signature of the particular different predetermined code. The cryptographic hash may be generated by calculating cryptographic hash of the particular different predetermined code concatenated with unique device identifier of the electronic communications device. The unique device identifier acts as a salt value in generation of the cryptographic hash. Herein, the salt value is appended to the particular different predetermined code and the result is hashed by applying the hashing algorithm. Specifically, the result includes the salt value appended with the particular different predetermined code. Notably, use of the unique device identifier for generating the cryptographic hash eliminates risks of attacks using rainbow table, wherein rainbow table attack is a type of hacking wherein a perpetrator tries to use a rainbow hash table to crack the passwords stored in a database. Specifically, rainbow hash table is a precomputed table for reversing the cryptographic hash function. Alternatively, optionally, in an instance when the unique device identifier has a null value, the cryptographic hash may be generated by calculating cryptographic hash of the unique device identifier concatenated with a 256-bit random value.

Optionally, the cryptographic hash may be generated by applying the following equation:

Cryptographic hash=SHA-256(particular different predetermined code|unique device identifier).

Alternatively, optionally, the cryptographic hash may be generated by applying the following equation:

Cryptographic hash=SHA-256(unique device identifier)(256-bit random value).

Additionally, optionally, in an instance, when the particular different predetermined code is not provided to the messaging application, a SHA-256 of the unique device identifier is stored in the electronic communications device.

Optionally, the predetermined access code and the particular different predetermined code have the same format. The predetermined access code and particular different predetermined code may be generated by applying the same constraints and methods. Beneficially, using the same format for the predetermined access code and for the particular different predetermined code reduces the effort required by the user to remember the predetermined access code and the particular different predetermined code. In addition, using the same format for the predetermined access code and for the particular different predetermined code allows for generation of the cryptographic hash using the same hashing techniques.

The messaging application is configured to open a session of the messaging service in the event that the user inputs the predetermined access code for the registered identity; and in the event that the particular different predetermined code is entered during the session, to delete from the device the database file containing the encrypted data. The messaging application opens the session of the messaging service and allows the user associated with the registered identity to send and receive messages and calls from one or more contacts in the electronic communications device. In addition, the user associated with the registered identity may provide the particular different predetermined code during the session. Notably, the user associated with the registered identity may provide the particular different predetermined code in an undesirable situation when access to the electronic communications device and the messaging application may be compromised. The messaging application is configured to receive the particular different predetermined code during the session and delete the database file including the message data in encrypted form.

As mentioned previously, the electronic communications device includes a data store and a processor, and stores the messaging application for executing the messaging service therein. In particular, the processor in the electronic communications device is configured to execute the messaging application to store the message data in encrypted form. The message data are associated with the identity registered on the messaging service. Notably, the message data are stored in a database file in the data store of the electronic communications device. Furthermore, the messaging application requires the user to input a predetermined access code for the registered identity before giving the user access to the message data stored in the encrypted form. Moreover, the messaging application is configured to delete the database file containing the encrypted data from the electronic communications device in an event that the particular different predetermined code is provided in place of the predetermined access code.

In an exemplary implementation, a user of a messaging application for a messaging service for an electronic communications device, namely "a smartphone" that includes a data store may use "the smartphone" to send and receive messages from contacts stored in "the smartphone". Notably, the user may have an identity "user name" registered with the messaging service. The electronic communications device, i.e. the "smartphone", may have message data related to sent and received messages. The message data may be stored in an encrypted form in the form of a database file in the data store. The user associated with the registered identity "user name" may have to provide a predetermined access code, such as "Routh@2018" before accessing the stored encrypted message data. Furthermore, in an event when the predetermined access code "Routh@2018" gets leaked, the user provides a particular different predetermined code, such as "Yohana@2020", and in such a case the encrypted message data is deleted from the database file in the data store of "the smartphone".

The processor in the electronic communications device, is further configured, in the event that the particular different predetermined code is provided in place of the predetermined access code, to send a communication to a server administering the messaging service to unregister the registered identity from the service so that the service will subsequently not transmit notifications of incoming calls or messages made to that identity.

Optionally, in the electronic communications device, the particular different predetermined code is stored in the data store of the device as a cryptographic hash.

Optionally, in the electronic communications device, the cryptographic hash is a concatenation of the particular different predetermined code and a unique device identifier.

Optionally, in the electronic communication device, the predetermined access code and the particular different predetermined code have the same format.

Optionally, in the electronic communications device, the processor is configured to execute the messaging application to open a session of the messaging service in the event that the user inputs the predetermined access code for the registered identity; and in the event that the particular different predetermined code is entered during the session, to delete from the device the database file containing the encrypted data.

DETAILED DESCRIPTION OF THE DRAWINGS

Referring to FIG. 1, illustrated is a block diagram of an electronic communications device 100, in accordance with an embodiment of the present disclosure. The electronic communications device 100 includes a data store 102 and a processor 104. The electronic communications device 100 has a messaging application for a messaging service. The processor 104 is configured to execute the messaging application to: store, in encrypted form, message data for an identity registered on the messaging service, as a database file in the data store 102 of the electronic communications device 100; require a user to input a predetermined access code for the registered identity before giving the user access to the stored message data; and delete from the electronic communications device 100 the database file containing the encrypted message data in an event that a particular different predetermined code other than the predetermined access code is provided in place of the predetermined access code. Furthermore, the electronic communications device 100 comprises a user-interface 106 for enabling user interaction with the messaging application on the electronic communications device 100.

Figure 2:
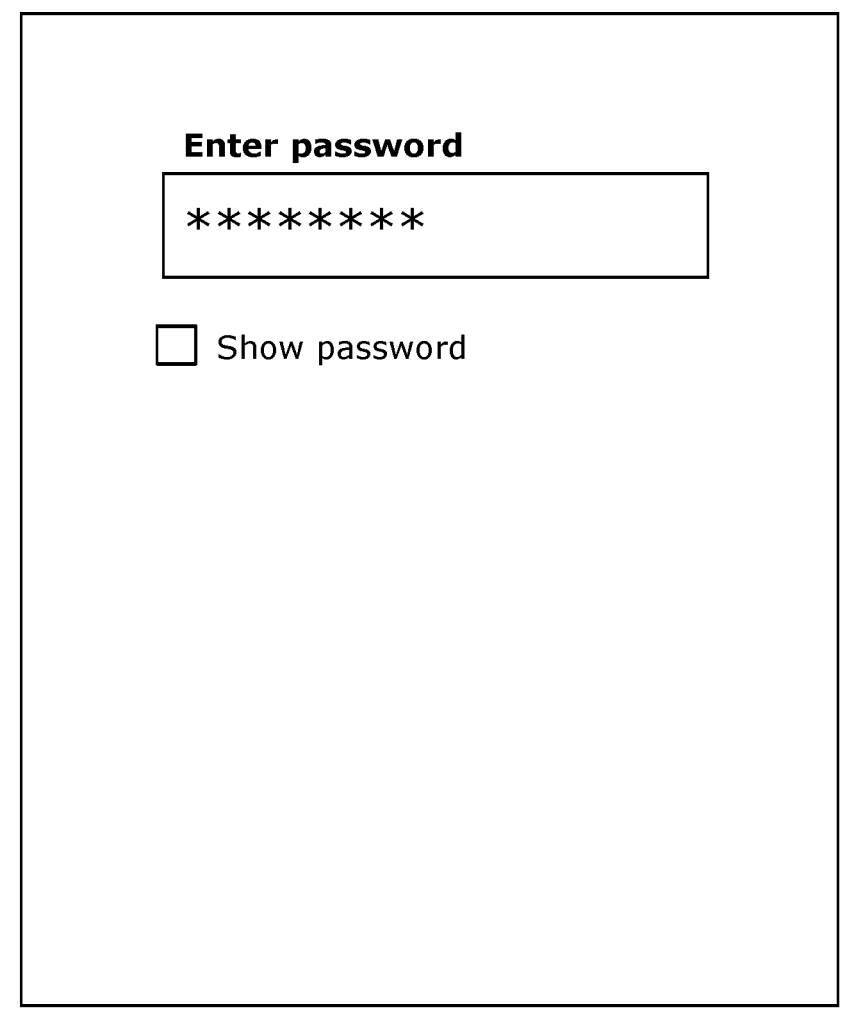

Referring to FIG. 2, illustrated is an exemplary schematic diagram of the user interface 106 for the electronic communications device 100 of FIG. 1, in accordance with an embodiment of the present disclosure. The user interface 106 as presented herein includes an input box for providing any one of: a predetermined access code and a particular different predetermined code. The predetermined access code and the particular different predetermined code, when entered, is not visible in the user interface but can be viewed by checking a check box with option to show password.

Figure 3:
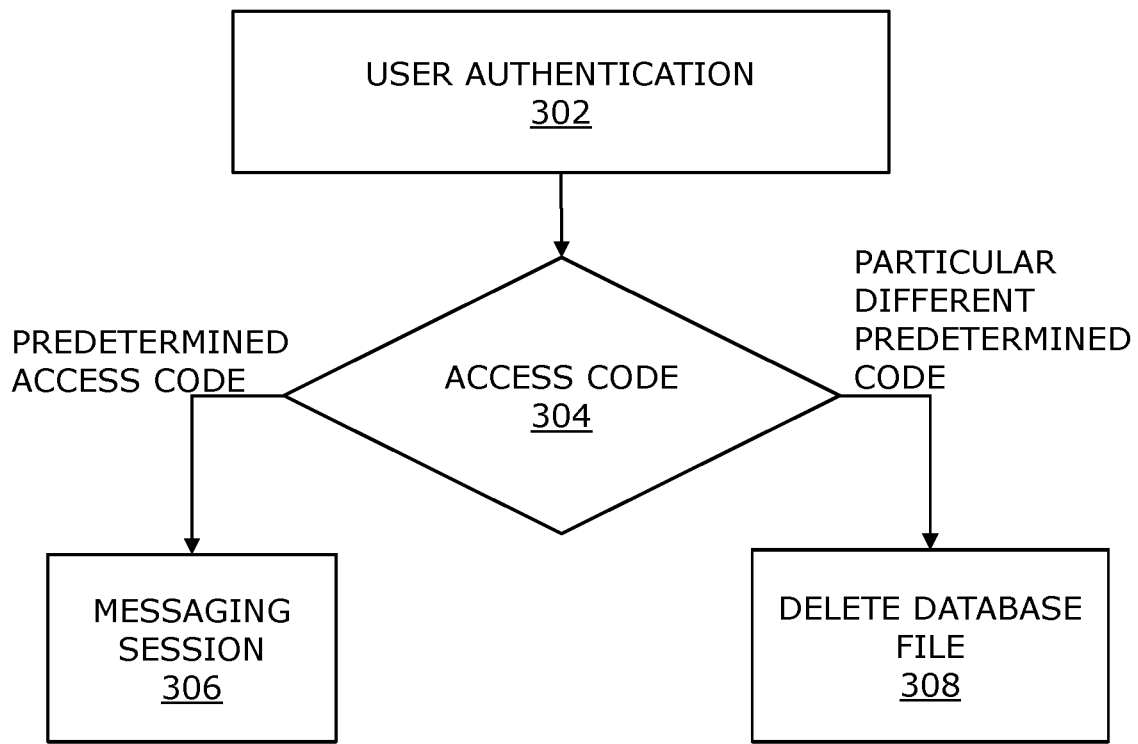
FIG. 3 illustrates a flowchart of steps of execution of a messaging application for a messaging service for an electronic communications device of FIG. 1.

Referring to FIG. 3, illustrated is a flowchart of steps of execution of a messaging application for a messaging service for an electronic communications device 100 of FIG. 1. At step 302, the messaging application performs user authentication by way of obtaining an access code from a user of the electronic communications device. Herein, the user is associated with an identity registered on the messaging service. At step 304, the messaging application analyses the access code provided by the user of the electronic communications device. In an instance, when the access code provided by the user is a predetermined access code, step 306 is executed. At step 306, a messaging session is initiated on the messaging application. In another instance, when the access code provided by the user is a particular different predetermined code, step 308 is executed. At step 308, a database file containing a message data of the user is deleted from the electronic communications device. Furthermore, the identity registered on the messaging service gets unregistered. Such unregistering of the identity eliminates possible detection of any use of the messaging service by the user.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A messaging application for a messaging service for an electronic communications device, the electronic communications device including a data store, a memory storing non-transitory machine readable instructions and a hardware processor, wherein execution of the non-transitory machine readable instructions by the hardware processor is configured to cause the messaging application to:
    store, in encrypted form, message data for an identity registered on the messaging service as a database file on the electronic communications device;
    require a user to input a predetermined access code for the registered identity before giving the user access to the stored message data; and
    delete from the device the database file containing the encrypted data in the event that a particular different predetermined code other than the predetermined access code is provided in place of the predetermined access code;
    wherein execution of the machine readable instructions by the hardware processor is further configured, in the event that the particular different predetermined code is provided in place of the predetermined access code, to cause the messaging application to send a communication to a server administering the messaging service to unregister the identity from the service so that the service will subsequently not transmit notifications of incoming calls or messages made to that identity.

2. The messaging application as claimed in claim 1, wherein the particular different predetermined code is stored in the data store of the device as a cryptographic hash.

3. The messaging application as claimed in claim 2, wherein the cryptographic hash is a concatenation of the particular different predetermined code and a unique device identifier.

4. The messaging application as claimed in claim 1, wherein the predetermined access code and the particular different predetermined code have the same format.

5. The messaging application as claimed in claim 1, wherein the messaging application is configured to:
    open a session of the messaging service in the event that the user inputs the predetermined access code for the registered identity; and
    in the event that the particular different predetermined code is entered during the session, to delete from the device the database file containing the encrypted data.

6. The messaging application as claimed in claim 1, wherein the messaging application is configured to accept access codes in the form of gestures captured by an image capture module of the device, or patterns of touch captured by a touch-sensitive interface of the device.

7. An electronic communications device including a data store and a processor, the electronic communications device having a messaging application for a messaging service, the processor being configured to execute the messaging application to:
    store, in encrypted form, message data for an identity registered on the messaging service, as a database file in the data store of the device;
    require a user to input a predetermined access code for the registered identity before giving the user access to the stored message data; and
    delete from the device the database file containing the encrypted data in the event that a particular different predetermined code other than the predetermined access code is provided in place of the predetermined access code,
    wherein the processor is further configured, in the event the particular different predetermined code is provided in place of the predetermined access code, to send a communication to a server administering the messaging service to unregister the identity from the service so that the service will subsequently not transmit notifications of incoming calls or messages made to that identity.

8. The electronic communications device as claimed in claim 7, wherein the particular different predetermined code is stored in the data store of the device as a cryptographic hash.

9. The electronic communications device as claimed in claim 8, wherein the cryptographic hash is a concatenation of the particular different predetermined code and a unique device identifier.

10. The electronic communications device as claimed in claim 7, wherein the predetermined access code and the particular different predetermined code have the same format.

11. The electronic communications device as claimed in claim 7, wherein the processor is configured to execute the messaging application to:
    open a session of the messaging service in the event that the user inputs the predetermined access code for the registered identity; and
    in the event that the particular different predetermined code is entered during the session, to delete from the device the database file containing the encrypted data.

* * * * *